Jan. 16, 1951 J. MARCO 2,538,465
ROTARY FEED CONTINUOUS MIXER
Filed May 3, 1949 4 Sheets-Sheet 2
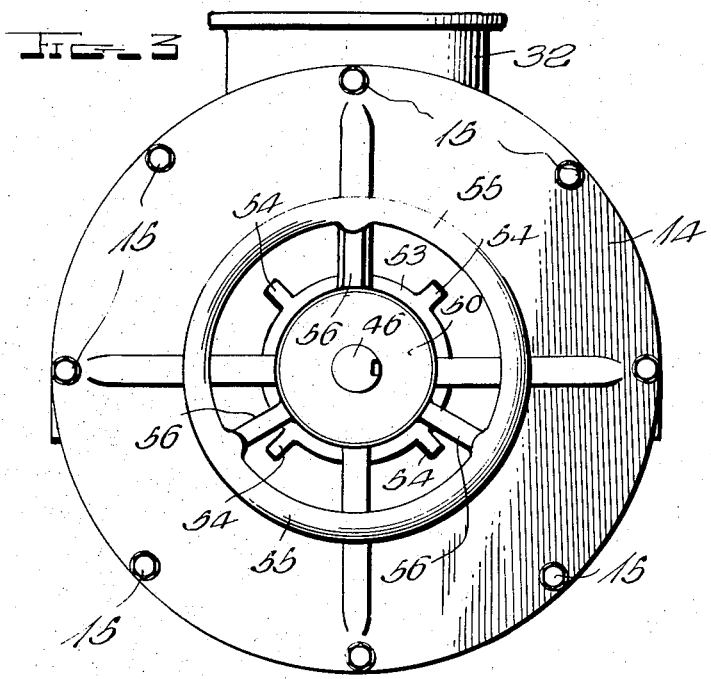
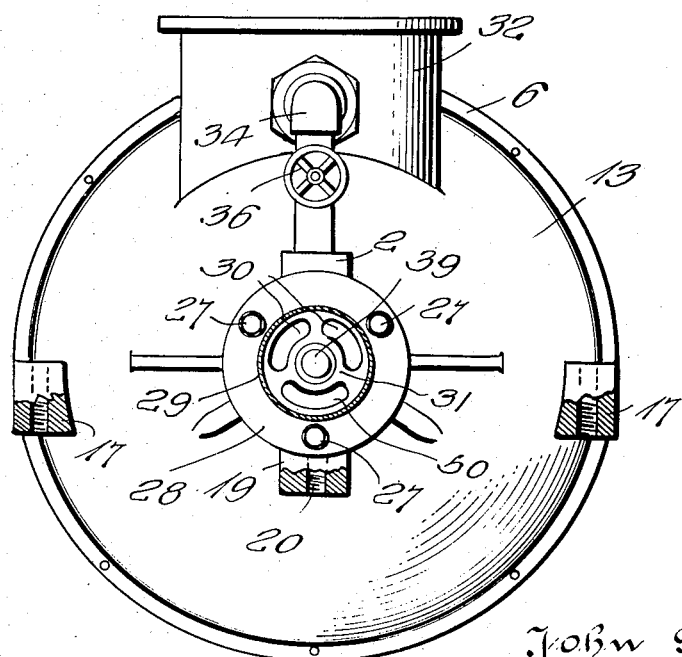
INVENTOR.
John Marco,
BY
Jacobi y Jacobi
ATTORNEYS Jan. 16, 1951  J. MARCO  2,538,465
ROTARY FEED CONTINUOUS MIXER
Filed May 3, 1949  4 Sheets-Sheet 3
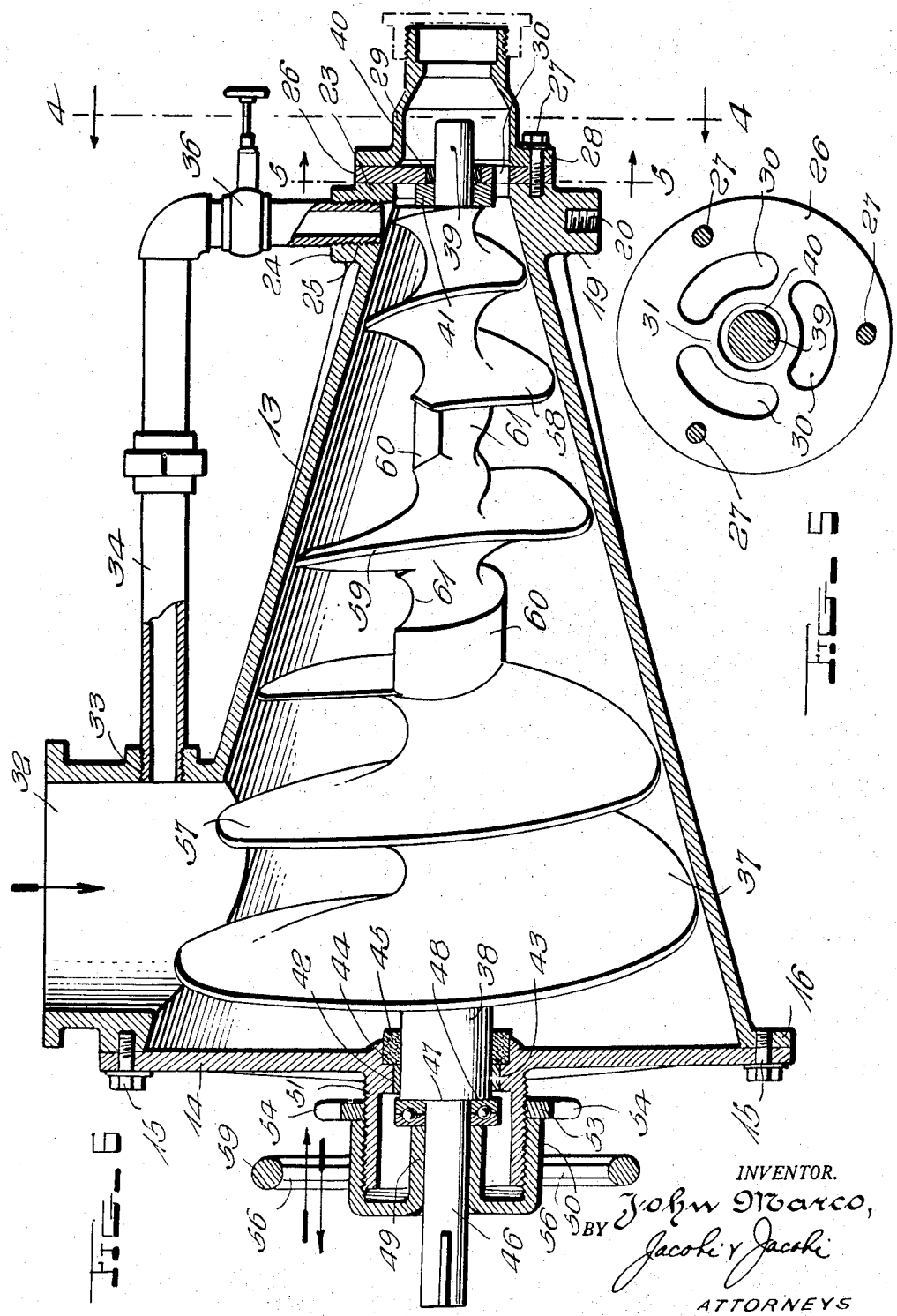
INVENTOR.
John Marco,
BY Jacobi y Jacobi
ATTORNEYS

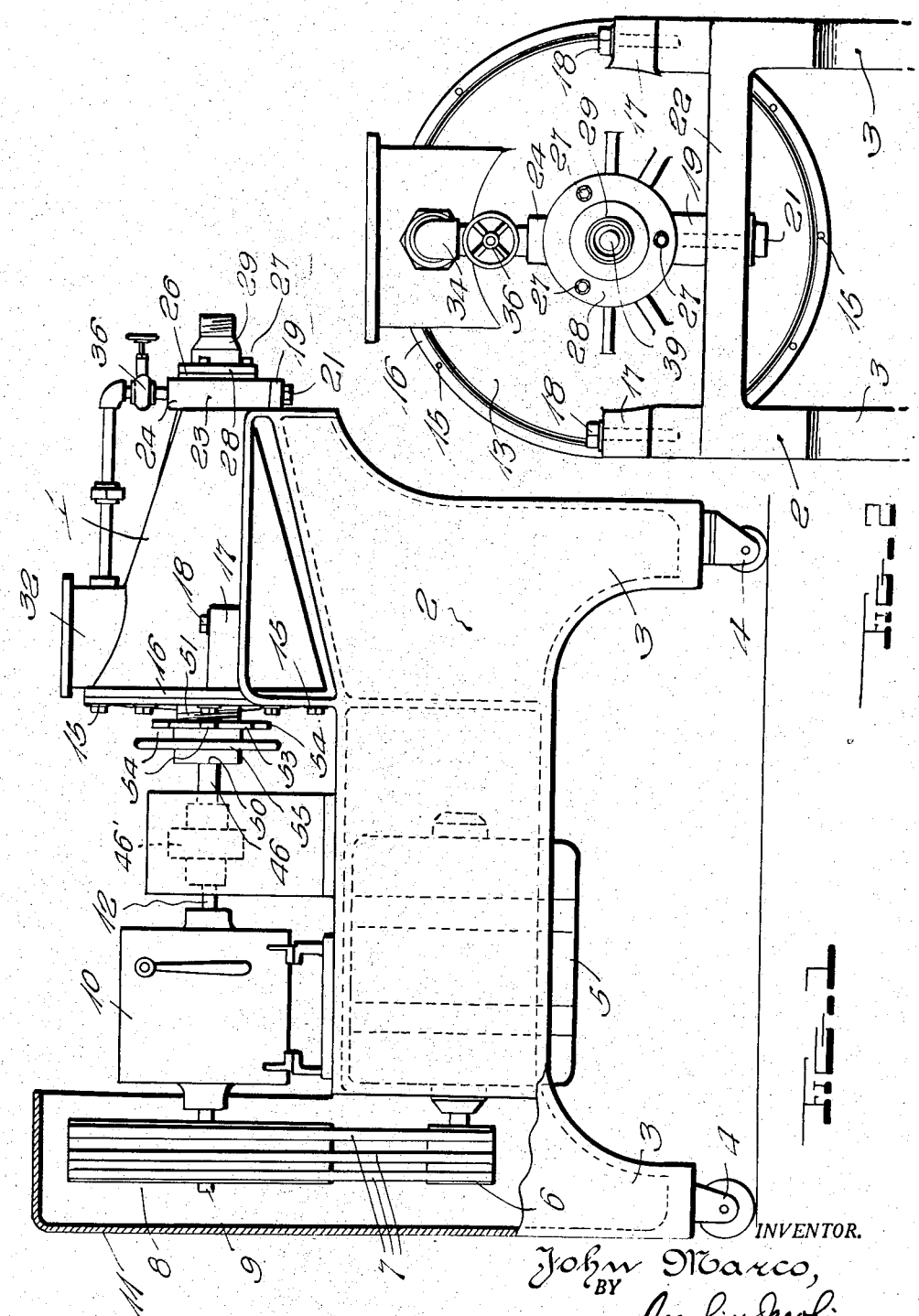

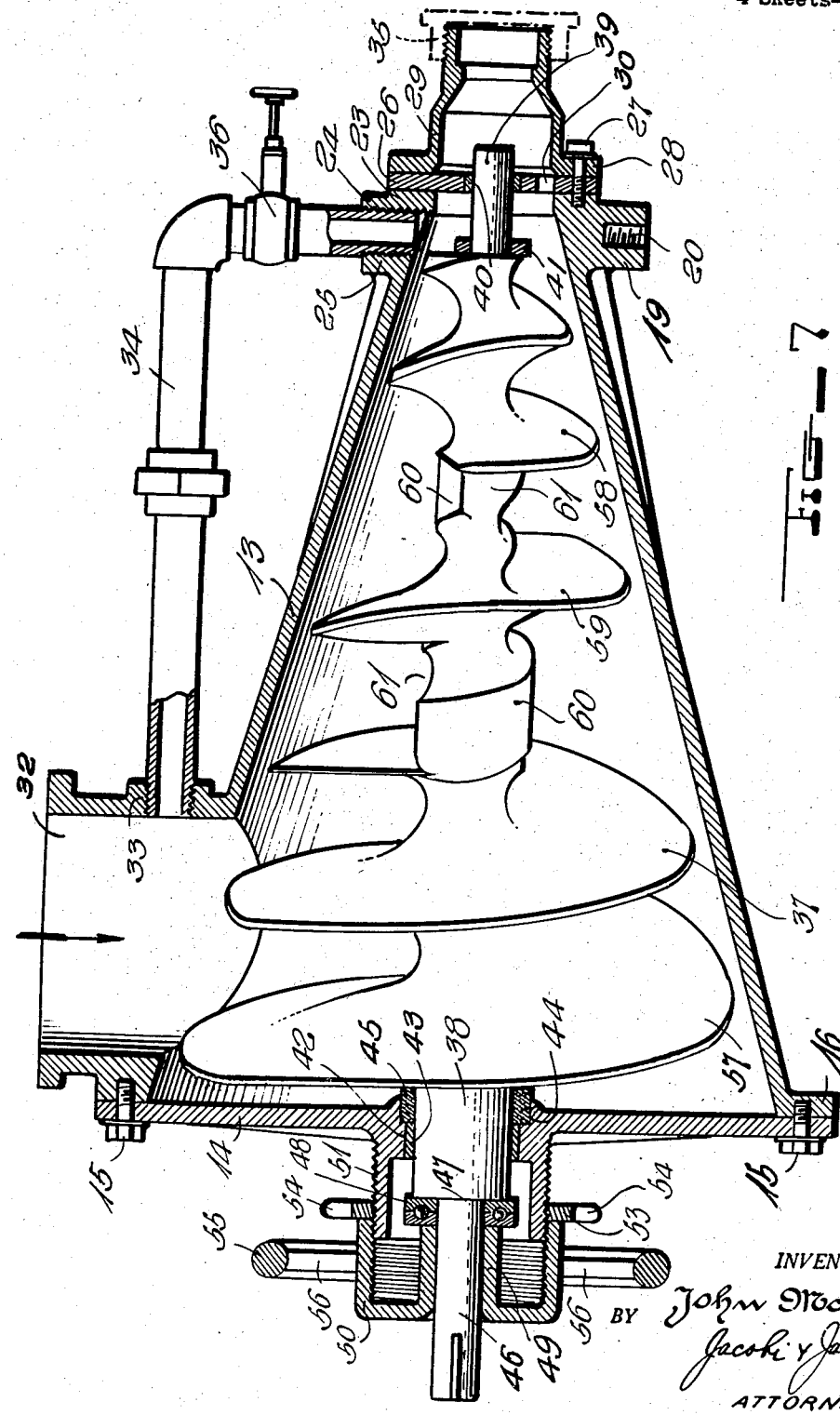

Patented Jan. 16, 1951

2,538,465

UNITED STATES PATENT OFFICE 2,538,465

ROTARY FEED CONTINUOUS MIXER

John Marco, Wilmington, Del.

Application May 3, 1949, Serial No. 91,201

2 Claims. (Cl. 259—97)

This invention relates to a rotary feed continous flow mixer which may constitute an element of a homogenizing machine or be used solely as a mixer and material delivered therefrom into packages or directly to a place where the material is to be used.

Another object of the invention is to provide a continuous mixer of such construction that material may be moved through a casing from an inlet towards an outlet by a device which not only serves as a conveyor but also as a rotary continuous mixer which imparts a grinding action to the material and very thoroughly mixes the material as it moves continuously towards the outlet.

Another object of the invention is to provide a continuous mixer having a casing tapered towards its outlet end, a screw conveyor being rotatably mounted in the casing and having its spirally extending blade interrupted intermediate its length so that the combined conveyor and mixer is divided into sections which are spaced from each other and thus allow the material to accumulate between the said sections and cause a more effective mixing action to take place.

Another object of the invention is to provide a continuous mixer having a screw conveyor so mounted in a tapered casing that the conveyor may be shifted longitudinally to adjusted positions and thus a predetermined clearance between the conveyor and the wall of the casing will be provided. This adjustment of the screw conveyor allows either thin or thick and viscous materials to be easily passed through the casing and thoroughly mixed during its continuous movement to the outlet of the casing.

Another object of the invention is to provide a continuous mixer of such construction that after material has been carried to the outlet end of the casing it may be delivered into a pipe which returns the material to the inlet end of the casing for continuous repassage through the mixer and thus obtain a more thorough mixing of the material.

Another object of the invention is to provide a continuous mixer which can be easily taken apart for thorough cleaning when necessary.

The invention is illustrated in the accompanying drawings wherein:

Figure 1 is a side elevation of a mixing machine formed in accordance with the invention;

Figure 2 is a view in elevation looking at the rear end or outlet end of the mixer;

Figure 3 is a view looking at the front end of the mixer;

Figure 4 is a view taken along the line 4—4 of Figure 6;

Figure 5 is a view taken along the line 5—5 of Figure 6;

Figure 6 is a sectional view taken longitudinally through the mixer; and

Figure 7 is a view similar to Figure 6, showing the feed screw shifted longitudinally to an adjusted position.

This improved rotary feed continuous mixer which has been indicated in general by the numeral 1 has been shown mounted upon a frame 2 having legs 3 provided with castors 4. A motor 5 is mounted in the frame and upon the shaft of this motor is mounted a pulley 6 about which are trained belts 7 which extend upwardly therefrom and are engaged about a larger pulley 8 carried by a shaft 9 projecting from a gear box 10 which is mounted upon the forward portion of the frame 2. A hood or shield 11 extending upwardly from the frame encloses the pulleys and the belts. The shaft 12 which projects from the rear end of the gear box serves as a drive shaft for imparting rotary motion to the feed screw of the improved mixer. It will be understood that the mixer may be mounted upon other supports and that other mechanism may be employed for imparting rotary movement to its feed screw.

The mixer has a casing 13 which is circular in cross section and tapered from its front end to its rear end, the large front end being closed by a head or plate 14 through which screws 15 are passed to removably secure the head to a flange 16 surrounding the front end of the casing. Blocks 17 project laterally from opposite sides of the casing to receive screws 18 by means of which side portions of the casing are secured to the supporting frame and at its rear end the casing is formed with a depending block 19 formed with a threaded opening to receive a securing screw 21 passed upwardly through the cross bar 22 of the frame. The block 19 extends downwardly from a collar surrounding the rear end of the casing and from the upper portion of this collar projects a boss 24 formed with a threaded opening 25 having its inner end communicating with the rear end of the chamber within the casing close to the open rear end thereof.

A baffle plate 26 fits flat against the rear end of the casing where it is secured by screws 27 which also pass through a flange 28 surrounding a nozzle 29 and secure the nozzle to the rear end of the casing in cooperating relation to the outlet of the casing. The baffle plate is formed with circumferentially extending openings 30 through which material may flow into the nozzle, and at its center the plate is formed with an opening 31. An inlet throat 32 rises from the upper portion of the front end of the casing, and this throat is formed with a threaded opening 33 to receive the threaded end of a pipe forming a portion of a pipe line or conduit 34. The conduit extends horizontally over the casing towards the rear end thereof and has a downwardly extending rear end portion which is screwed into the opening of the boss 24. Normally material flows from the casing through the spout 29 as soon as it reaches the rear end of the casing, but when the spout is closed by a cap 35 screwed upon its outer end and the valve 36 of the conduit opened, the material may be returned to the inlet neck for retreatment in the casing. The valve is usually closed and the cap is only applied when retreatment of the material is desired. Liquids and solids or all solids may be assembled and thoroughly mixed or blended through use of the continuous rotary feed mixer and the material delivered through the inlet may be metered on a continuous flow rate. If small quantities are delivered into a hopper with which the throat 32 is connected the machine becomes a batch mixer. In some cases the mixed material may be extruded or forced under its own pressure into a forming head attached to the outlet of the mixer.

Material which enters the casing through the inlet neck 32 must be moved towards the outlet at the rear end of the casing and in order to do so there has been provided a feed screw 37 which extends longitudinally in the casing and at its front and rear ends is formed with stub shafts 38 and 39. The shaft 39 is rotatably and slidably mounted through a bearing 40 mounted in the center opening of the baffle plate 26 and about this shaft is mounted a thrust block or collar 41 which limits rearward movement of the screw in the casing by engagement with the inner surface of the baffle plate.

The head 14 is formed at its center with an opening 42 in which is mounted a bushing 43 through which the shaft 38 passes, the inner end portion of the opening 42 being enlarged to form a pocket 44 in which a sealing ring 45 or other suitable material is mounted to prevent material from leaking out of the casing about the shaft 38. The shaft 38 is reduced in diameter from its outer end to form a stem 46 which is connected with a shaft 12 by a coupling 46'. The stem is surrounded by an annular shoulder 47 which bears against a thrust bearing 48 and the stem passes through a sleeve 49 carried by a cap 50 which is internally threaded and screwed upon an externally threaded sleeve 51 surrounding the opening 42 of the head or closure plate 14. When the cap is turned in a tightening direction upon the sleeve the screw 37 will be forced towards the outlet end of the casing and the convolutions of its spirally extending blades disposed quite close to the walls of the casing with a clearance which is preferably 1/64 of an inch, as shown in Figure 6.

Pressure exerted by material passing through the casing urges the screw towards the front end of the casing so that the shoulder 47 bears against the thrust bearing 48 and when the cap is turned in a loosening direction, this pressure shifts the screw forwardly and provides a greater clearance between the convolutions of the screw and the walls of the casing, as shown in Figure 7. A locking nut 53 having arms or lugs 54 extending from it is threaded upon the sleeve for abutting engagement with the cap to hold the cap in an adjusted position and in order to permit the cap to be easily turned, there has been provided a wheel 55 which surrounds the cap and is connected therewith by spokes 56. The cap will be turned to effect longitudinal adjustment of the screw according to the type of material being fed through the casing and resistance of the material will at all times urge the screw towards the front end of the casing and keep it in engagement with the thrust bearing 48 and maintain its helical blades in desired spaced relation to the walls of the casing. The maximum clearance shown in Figure 7 may be $\frac{1}{16}$ of an inch, $\frac{3}{8}$ of an inch, or any other predetermined distance.

As the material is fed longitudinally through the casing towards the outlet at the rear end thereof by the screw 37, the material is churned and mixed by action of the screw. This screw is of special construction. The screw shown in Figures 6, 7 and 11 has a front section 57, a rear section 58, and an intermediate section 59 which are formed with helical blades, but it will be understood that additional intermediate sections may be provided if so desired. These sections are spaced from each other and between them are formed semicircular portions or blocks 60. These blocks are of appreciably less thickness than the diameters of the helical blades and each has an arcuate convex face extending circumferentially of the screw and a concaved face 61 constituting a pushing surface extending between ends of the convexed face and at its ends intersecting ends of the convexed face. The concaved faces of the blocks constitute pushing surfaces. Material which enters the casing through the inlet neck or throat 32 is first engaged by the convolutions of the forward portion 57 of the screw and moved through the casing until it reaches the space between the front section 57 and the intermediate section 59. In this space, the material hesitates in its movement towards the rear end of the casing and is subjected to a compressing action by material being advanced by the front section. The compressed material is then engaged with the intermediate section 59 and advanced until it reaches the space between the intermediate section and the rear section 58 which again advances the material after it has been compressed in the space between the intermediate section and the rear section. It should be noted that while the material is being compressed in the spaces between the sections and advanced therein towards the rear end of the casing, the block 60 exerts a battering action upon the material and aid in mixing the material while it is being compressed.

In addition, it should be noted that since the diameter of the casing is gradually reduced towards the outlet at its rear end the material is subjected to a radially applied compressing force and a churning action takes place while the sections of the screw are moving the material longitudinally in the casing. Therefore, the material will be so acted upon that its ingredients will be thoroughly mixed and intermingled as it passes through the casing and will be discharged as a homogeneous mass from the outlet nozzle 29. If it is found that a more thorough mixing is required, the cap 35 is applied and the valve 36 opened and the material upon reaching the rear end of the casing will flow through the return pipe 34 and into the throat for repassage through the casing.

From the foregoing description of my improved mixing device, the construction and operation thereof will be readily understood and it will be seen that I have provided a comparatively simple, inexpensive and efficient means for carrying out the various objects of the invention.

While I have particularly described the elements best adapted to perform the functions set forth, it is apparent that various changes in form, proportion and in the minor details of construction may be resorted to, without departing from the spirit or sacrificing any of the principles of the invention.

Having thus described the invention, what is claimed is:

1. A rotary feed continuous mixer comprising a casing tapered towards its rear end and having an outlet at its rear end and an inlet at its front end, and a combined feed screw and mixing screw extending longitudinally in said casing and conforming to the taper of the casing, said screw having sections formed with helical blades, the said sections being spaced from each other longitudinally of the screw for allowing compression of material into a homogeneous mass while being advanced from one section to another, and a block between adjacent sections of less thickness than the diameter of the helical blades, said block being formed with an arcuate convexed face extending circumferentially of the screw and with an arcuate concaved face extending between and intersecting ends of the convexed face.

2. A rotary feed continuous mixer comprising a casing tapered towards one end and having an outlet at the said end and an inlet at its other end, and a combined feed screw and mixing screw extending longitudinally in said casing and conforming to the taper of the casing, said screw having sections formed with helical blades, the said sections being spaced from each other longitudinally of the screw for allowing compression of material into a homogeneous mass while being advanced from one section to another, and a block between adjacent sections of less thickness than the diameter of the helical blades, said block being formed with a convexed face extending circumferentially of the screw and with a nonconvexed face extending between ends of the convexed face and forming edges across the block at the intersection of its ends with the ends of the convexed face.

JOHN MARCO.

REFERENCES CITED

The following references are of record in the file of this patent:

UNITED STATES PATENTS

| Number | Name | Date |
| --- | --- | --- |
| 309,567 | Schlickeysen | Dec. 23, 1884 |
| 869,307 | Jones | Oct. 29, 1907 |
| 1,156,096 | Price | Oct. 12, 1915 |
| 1,189,861 | Norton | July 4, 1916 |
| 1,615,734 | Alfisi | Jan. 25, 1927 |
| 1,659,858 | Cooper | Feb. 21, 1928 |
| 1,847,690 | Hottman | Mar. 1, 1932 |
| 1,856,943 | Bonsieur | May 3, 1932 |
| 1,935,050 | Gordon | Nov. 14, 1933 |
| 2,042,161 | Satzinger | May 26, 1936 |
| 2,109,398 | McNitt | Feb. 22, 1938 |
| 2,485,854 | Zona | Oct. 25, 1949 |